(12) United States Patent
Atli et al.

(10) Patent No.: US 10,397,124 B2
(45) Date of Patent: Aug. 27, 2019

(54) SYSTEM AND METHOD TO PREVENT PERSISTENT FULL SWITCH QUEUES IN SOFTWARE DEFINED NETWORKS

(71) Applicant: ARGELA YAZILIM VE BILISIM TEKNOLOJILERI SAN. VE TIC. A.S., Istanbul (TR)

(72) Inventors: Ali Volkan Atli, Istanbul (TR); Serkant Uluderya, Istanbul (TR); Seyhan Civanlar, Istanbul (TR)

(73) Assignee: Argela Yazilim ve Bilisim Teknolojileri San. ve Tic. A.S. (TR)

( * ) Notice: Subject to any disclaimer, the term of this patent is extended or adjusted under 35 U.S.C. 154(b) by 121 days.

(21) Appl. No.: 15/408,069

(22) Filed: Jan. 17, 2017

(65) Prior Publication Data
US 2018/0205656 A1     Jul. 19, 2018

(51) Int. Cl.
| | | |
|---|---|---|
| *H04L 12/801* | (2013.01) | |
| *H04L 12/835* | (2013.01) | |
| *H04L 12/823* | (2013.01) | |
| *H04L 12/825* | (2013.01) | |
| *H04L 12/807* | (2013.01) | |

(52) U.S. Cl.
CPC .............. *H04L 47/30* (2013.01); *H04L 47/11* (2013.01); *H04L 47/27* (2013.01); *H04L 47/323* (2013.01)

(58) Field of Classification Search
CPC ......... H04L 47/12; H04L 47/11; H04L 47/25; H04L 47/323; H04L 47/30
See application file for complete search history.

(56) References Cited

U.S. PATENT DOCUMENTS

| | | | | |
|---|---|---|---|---|
| 8,441,925 | B1 * | 5/2013 | Lamb ..................... | G01R 31/08 370/229 |
| 9,860,183 | B2 * | 1/2018 | Roberts ................... | H04L 45/38 |
| 2016/0142285 | A1 * | 5/2016 | Lee ......................... | H04L 69/22 370/392 |

(Continued)

OTHER PUBLICATIONS

Ramakrishnan The Addition of Explicit Congestion Notification (ECN) to IP RFC 3168 Sep. 2001.*

(Continued)

*Primary Examiner* — Yemane Mesfin
*Assistant Examiner* — Henry Baron
(74) *Attorney, Agent, or Firm* — IP Authority, LLC; Ramraj Soundararajan

(57) ABSTRACT

An adaptive network-based approach for reducing congestion on certain select-group of flows within a programmable network wherein switches dynamically adjust the receive window size (rwnd) and/or the ACK pace of other TCP flows by interfering their ACK packets, those flows sharing network resources causing congestion on the select-group of flows. The TCP flow rate is reduced to make more network resources available to the group of select-flows. The system of invention further comprises a centralized controller detecting so called a 'bad queue' causing persistent traffic slow-down due to TCP behavior. The bad queue detection is performed by (i) monitoring switch ports' transmit and receive queues, (ii) calculating minimum packet sojourn times on queues, (iii) determining which flows to slow down to clear detected bad queues, and (iv) sending messages to certain switches to execute changes to a group of ACK packets.

17 Claims, 5 Drawing Sheets

(56) References Cited

U.S. PATENT DOCUMENTS

2017/0105138 A1* 4/2017 Huang ................ H04W 28/04

OTHER PUBLICATIONS

Allman et al., "TCP Congestion Control," Network Working Group, RFC 5681, Sep. 2009, 18pgs.
Paxson et al., "Computing TCP's Retransmission Timer," RFC 6298, Jun. 2011, 11pgs.
Nichols et al., "Controlling Queue Delay: A modem AQM is just one piece of the solution to bufferbloat," Networks, 10(5), May 2012, 15pgs.
Mckeown et al., "OpenFlow: Enabling Innovation in Campus Networks," ACMSIGCOMM Computer Communication Review, 38(2), Apr. 2008, pp. 69-74.
Ghobadi et al., "Rethinking End-to-End Congestion Control in Software-Defined Networks," Proceedings of the 11th ACM Workshop on Hot Topics in Networks, Seattle, Washington, Oct. 29-30, 2012, pp. 61-66.
Ramakrishnan et al., "The Addition of Explicit Congestion Notification (ECN) to IP," RFC 3168, Sep. 2001, 33pgs.

* cited by examiner

SYSTEM AND METHOD TO PREVENT PERSISTENT FULL SWITCH QUEUES IN SOFTWARE DEFINED NETWORKS

BACKGROUND OF THE INVENTION

Field of Invention

The present invention generally relates to software defined networks (SDNs), and particularly relates to a system and method designed for an improved congestion control in SDNs.

Discussion of Related Art

Any discussion of the prior art throughout the specification should in no way be considered as an admission that such prior art is widely known or forms part of common general knowledge in the field.

The Transmission Control Protocol (TCP) is a core protocol of the Internet protocol suite. Therefore, the entire suite is commonly referred to as TCP/IP. TCP provides a reliable, ordered and error-checked delivery of a stream of bytes between applications running on hosts communicating over an IP network. Almost all major Internet applications such as the Web, email, and video transmission rely on TCP. It is known as a reliable stream delivery service, which guarantees that all bytes received will be identical with bytes sent and in the correct order. Since packet transfer over many networks is not reliable, a technique known as positive acknowledgment with retransmission is used to guarantee reliability of packet transfers. This fundamental technique requires the receiver to respond with an acknowledgment message (ACK) as it receives data packets. The sender keeps a record of each packet it sends. The sender also maintains a timer from when the packet was sent, and retransmits a packet if the timer expires before the message has been acknowledged with an ACK. The timer is needed in case a packet gets lost or corrupted. TCP is considered to be a reliable transport mechanism because it requires the receiving computer to acknowledge not only the receipt of data but also its completeness and sequence.

While IP handles actual delivery of the data, for efficient routing through the network, TCP keeps track of the individual units of data transmission, called segments that a message is divided into. TCP accepts data from a data stream, divides it into chunks, and adds a header creating a so-called TCP segment, which is then encapsulated with an Internet Protocol (IP) datagram, and exchanged with peers. The TCP header is 20 bytes and contains 10 mandatory fields, and an optional extension field. The data section follows the header. Its contents are the payload data carried for the application.

TCP uses a sliding window flow-control mechanism to control the throughput over wide-area networks between end-users. As the receiver acknowledges initial receipt of data, it advertises how much data it can handle, called its receiver window size (rwnd). The rwnd changes in time and depends on how many segments can be processed by the available free buffer space in the receiver. The sender can transmit multiple packets, up to rwnd, before it stops and waits for an ACK. The sender tries to fill up the pipe, waits for an ACK, and then fills up the pipe again up to rwnd. Therefore, the basic TCP flow control mechanism (between end-users) is the sliding window superimposed on a range of bytes beyond the last explicitly acknowledged byte. Its sliding operation limits the amount of unacknowledged transmissible data that a TCP sender can emit.

The sliding window flow control mechanism works in conjunction with the Retransmit Timeout Mechanism (RTO), which is a timeout to prompt a retransmission of an unacknowledged segment. The timeout length is calculated based on a running average of the Round Trip Time (RTT) for ACK receipt, i.e., if an acknowledgment is not received within (typically) the smoothed RTT+4*mean deviation, then packet loss is inferred and the segment pending acknowledgment is then retransmitted. Therefore, rwnd and RTT are the two key parameters of TCP flow-control.

TCP contain four intertwined algorithms for congestion control: Slow-start, congestion avoidance, fast retransmit, and fast recovery [see Allman et al., "TCP Congestion Control", RFC5681, 2009.]. In addition, senders can employ an RTO that is based on the estimated RTT between the sender and receiver. The behavior of this timer is specified in [see Paxton et al., "Computing TCP's Retransmission Timer, RFC 6298, 2011.]. There are several prior art algorithms for estimation of WIT. Congestion can occur when data arrives on a big pipe (a fast LAN) and gets sent out a smaller pipe (a slower WAN). Congestion can also occur when multiple input streams arrive at a router whose output capacity is less than the sum of the input capacity.

Congestion avoidance is a way to deal with lost packets, measuring packet delay or network-supported Explicit Congestion Notification (ECN). Different variants of TCP have different procedures and behaviors. In the loss-based algorithm, for example, there is no explicit signaling about congestion. Therefore, an assumption is made that the loss of a packet signals congestion somewhere in the network between the sender and receiver. There are two indications of packet loss: a timeout occurring on an ACK, which triggers slow-start, and the receipt of duplicate ACKs (dupACK), which triggers congestion avoidance. In the delay-based algorithm, congestion avoidance and slow-start are both triggered by monitored packet delays and by reacting to increases in delay in an attempt to avoid network congestion. Congestion avoidance and slow start are two independent algorithms with different objectives. But, when congestion occurs TCP must slow down its transmission rate of packets into the network, and then invoke slow start to get things going again. In practice they are implemented together.

In the classical loss-based algorithms, congestion avoidance and slow start require that two variables be maintained for each connection: a congestion window, cwnd, of the sender and a slow start threshold, ssthresh. Slow start has cwnd begin at one segment, and be incremented by one segment every time an ACK is received. As mentioned earlier, this opens the window exponentially: send one segment, then two, then four, and so on. Congestion avoidance dictates that cwnd be incremented each time an ACK is received. This is a linear growth of cwnd, compared to slow start's exponential growth. The increase in cwnd should be at most one segment each round-trip time (regardless how many ACKs are received in that RTT), whereas slow start increments cwnd by the number of ACKs received in a round-trip time. TCP may generate an immediate acknowledgment (a duplicate ACK) when an out-of-order segment is received. This duplicate ACK should not be delayed. The purpose of this duplicate ACK is to let the other end know that a segment was received out of order, and to tell it what sequence number is expected.

Since TCP does not know whether a dupACK is caused by a lost segment or just a reordering of segments, it waits for a small number of dupACKs to be received. It is assumed that if there is just a reordering of the segments, there will be only one or two duplicate ACKs before the reordered segment is processed, which will then generate a new ACK. If three or more duplicate ACKs are received in a row, it is a strong indication that a segment has been lost. TCP then performs a retransmission of what appears to be the missing segment, without waiting for a retransmission timer to expire. After fast retransmit sends what appears to be the missing segment, congestion avoidance, but not slow start is performed. This is the fast recovery algorithm. It is an improvement that allows high throughput under moderate congestion, especially for large windows. The reason for not performing slow start in this case is that the receipt of the duplicate ACKs tells TCP more than just a packet has been lost. Since the receiver can only generate the duplicate ACK when another segment is received, that segment has left the network and is in the receiver's buffer. That is, there is still data flowing between the two ends, and TCP does not want to reduce the flow abruptly by going into slow start.

In summary, TCP's slow-start algorithm attempts to take full advantage of the network capacity. While the flow-control is typically controlled by the receiver-side window, rwnd, the congestion-control is controlled by the sender-side window, cwnd.

Note that these mechanisms are designed between the sender and receiver (end-to-end) assuming that the network plays no role in adjusting or interfering the TCP behavior. In conclusion, the pace of a TCP sender is controlled by cwnd, RTT, and the pace at which ACKs are received, while the upper bound is always rwnd.

One of the key observations in TCP networks is a phenomenon called bufferbloat [see Nichols, "Controlling Queue Delay: A modern AQM is just one piece of the solution to bufferbloat," *NETWORKS*, May 6, 2012.]. It is a latency caused within a TCP network due to persistent buffer/queue fullness. These queues are called 'bad queues'. Typically, queues may fill up because of traffic bursts, but they eventually clear up (within a few RTT after TCP flow control and congestion control slows down traffic). Bad queues do not clear up. They remain full causing all traffic passing through these queues to significantly slow down. The minimum packet sojourn time (the minimum time a packet traverses between getting in and out of the queue over a period of time) in a normal queue after a few RTT becomes zero. But, in the scenario of a bad queue it remains to be a fixed time period. Packet sojourn times become a primary contributor of delay in the network when there are bad queues. One of the goals of this invention is to define a creative method to detect and remove bad queues from the network, and doing so, significantly reduce the congestion on certain flows.

Software defined networking (SDN) is a recent programmable networking paradigm and a strong candidate to become the architecture of the future Internet. Fundamentally, the key concepts of SDN offer the basis for the system and method of this invention. A typical SDN is decoupled into two planes: a data plane comprised of 'switches', which perform data forwarding, and a control plane connecting all switches to a 'controller', which calculates routing (or flow) tables and sends them to the switches. Doing so, the packet forwarding and route calculation tasks are decoupled. The switches perform fast packet forwarding while the controller performs fast calculation of routes. Switches are mainly special-purpose hardware devices designed for packet switching, while the controller is software based and logically centralized. In an SDN, the controller sends forwarding rules to the network switches using a southbound interface such as OpenFlow [see McKeown et al., "OpenFlow: enabling innovation in campus networks," SIGCOMM Computer Communication Review, April 2008.] to generally specify or modify the path of the data packets, or sometimes to alter the packet header fields.

The SDN controller has a global visibility of the network. Meaning, it collects real-time data from switches about the network topology, traffic performance, and volume of data flows. Accordingly, it can modify the traffic distribution within the network to optimize the network utilization. The fact that TCP relies solely on end-to-end measurements of packet loss or packet delay as the only sources of feedback from the network means that TCP has a very limited view of the network state such as the trajectory of available bandwidth, congested links, network topology, and traffic volumes. Thus, our question is: Can we build a system that observes the state of the end to end TCP path and even consider the general dynamics of an overall SDN, and change TCP's behavior accordingly? The answer is yes. We can simplify tune different TCP parameters (cwnd, rwnd, rtt and ACK pace) according to network conditions using feedback coming from the state of the network. When the SDN controller has the visibility of network queue fullness and potential bad queues in the network, it can take proper actions to reduce traffic to relieve bad queues and eliminate bufferbloat.

The controller can be provided the information of which flows are large and potentially more important under congestion according to an aspect of this invention. For example, some video streaming flows may be using UDP instead of TCP, which means under congestion, packet loss becomes inevitable. This will cause significant quality degradation perceived at the receiver side. If video streaming uses TCP, on the other hand, congestion will cause drastic slow down, which results in delay in getting video frames at the receiver side. In order to prevent congestion impacting such flows, controller can force flow-control on other flows sharing the same network resources with the flows carrying video streams. When these flows slow down, the bursts will be smoothed and bufferbloat in network switches will be eliminated. The resultant net effect will be reduced congestion specifically on video streams. Since the receivers (hosts) will most likely have large buffers (typically the case, except mobile hosts), they will not trigger flow-control.

According to an aspect of this invention, network switches will capture ACK messages coming from the receivers and either slow down their pace or modify the ACK header by reducing the rwnd according to an estimated (or artificial) RTT forcing some of the packet flows to reduce rate when one or more bad queues are detected in the network switches.

It is key to keep the behavior of the TCP stack in the end-user's host unchanged. Even if adding a new feature to end-user's TCP stack is an option, this is not feasible since the number of devices connected to Internet in 2015 globally has reached 10 Billion. Although a proposal is provided in [see Ghobadi et al., "Rethinking end to end Congestion Control in Software Defined Networks," Proceedings of the 11$^{th}$ ACM Workshop on Hot Topics in Networks, 2012.] with a change in host behavior, such TCP stack changes are not practical and globally implementable.

Embodiments of the present invention are an improvement over prior art systems and methods.

SUMMARY OF THE INVENTION

In one embodiment, the present invention provides a method as implemented in a controller in a software defined network (SDN), where a packet flow traverses at least a first switch and a second switch that are part of the SDN, the first and second switches communicating with the controller via a first and second control connection, respectively, the method comprising the steps of: (a) collecting, via the first control connection, a first data indicative of a congestion at the first switch, and collecting, via the second control connection, a second data indicative of a congestion at the second switch; (b) determining, from collected first and second data, a presence of queue fullness in the second switch; (c) determining when to apply TCP flow control to the packet flow at the first switch based on the determining in (b); (d) sending a forwarding rule to the first switch to intercept ACK packets of the packet flow, wherein the first switch installs the forwarding rule and applies the forwarding rule to matching ACK packets; (e) observing the previously determined queue fullness in the second switch and, upon observing, increasing or reducing the rate of said TCP flow control, until the congestion is completely removed; and (f) observing absence of the previously determined queue fullness in the second switch and, upon observing such absence, removing the forwarding rule from the first switch.

In another embodiment, the present invention provides a method as implemented in a controller in a software defined network (SDN), where a first packet flow and a second packet flow traverses at least a first switch that is part of the SDN and the second packet flow comprising a TCP flow originating at a second switch, the first and second switches communicating with the controller via a first and second control connection, respectively, the method comprising the steps of: (a) collecting, via the first control connection, congestion indicators associated with the first and second packet flows; (b) determining, from collected data in (a), a presence of queue fullness in the first switch; (c) determining when to apply TCP flow control only to the second packet flow at the second switch based on the determining in (b); (d) sending a forwarding rule to the second switch to intercept ACK packets of the second packet flow, wherein the second switch installs the forwarding rule and applies the forwarding rule to matching ACK packets in the second packet flow; (e) observing the previously determined congestion indicator of the first flow and, upon observing, increasing or reducing a rate of said TCP flow control to the second packet flow, until such congestion on the first packet flow is completely removed; and (f) observing absence of the previously determined congestion indicator of the first flow and, upon observing such absence, removing the forwarding rule from the second switch.

In yet another embodiment, the present invention provides a controller in a software defined network (SDN) comprising: (a) a first logic to receive measurements of congestion indicators from each network switch; (b) a database storing received measurements; (c) a network analyzer logic determining congestion location within the SDN; (d) an intelligent correlation algorithm to determine which TCP flows to apply network-based flow control to eliminate queue fullness, and at which switch within the SDN to apply such network-based flow control; (e) a second logic to translate the network-based flow control determined in (d) to forwarding rules, where a packet flow traverses at least a first switch and a second switch that are part of the SDN, the first and second switches communicating with the controller via a first and second control connection, respectively, wherein the controller: (1) collects, via the first control connection, a first congestion indicator at the first switch, and collecting, via the second control connection, a second congestion indicator at the second switch; (2) determines, from collected first and second congestion indicators, a presence of queue fullness in the second switch; (3) determines when to apply TCP flow control to the packet flow at the first switch based on the determining in (2); (4) sends a forwarding rule to the first switch to intercept ACK packets of the packet flow, wherein the first switch installs the forwarding rule and applies the forwarding rule to matching ACK packets; (5) observes the previously determined congestion indicator, upon observing, increasing or reducing a rate of the TCP flow control, until such congestion is completely removed; and (6) observes absence of the previously determined queue fullness in the second switch and, upon observing such absence, removing the forwarding rule from the first switch.

In yet another embodiment, the present invention provides a controller in a software defined network (SDN) comprising: (a) a first logic to receive measurements of congestion indicators from each network switch; (b) a database storing received measurements; (c) a network analyzer logic determining congestion location within the SDN; (d) an intelligent correlation algorithm to determine which TCP flows to apply network-based flow control to eliminate queue fullness, and at which switch within the SDN to apply such network-based flow control; (e) a second logic to translate the network-based flow control determined in (d) to forwarding rules, where a first packet flow and a second packet flow traverses at least a first switch that is part of the SDN and the second packet flow comprising a TCP flow originating at a second switch, the first and second switches communicating with the controller via a first and second control connection, respectively, wherein the controller: (1) collects, via the first control connection, data indicative of a congestion associated with the first and second packet flows; (2) determines, from collected data in (1), a presence of queue fullness in the first switch; (3) determines when to apply TCP flow control only to the second packet flow at the second switch based on the determining in (2); (4) sends a forwarding rule to the second switch to intercept ACK packets of the second packet flow, wherein the second switch installs the forwarding rule and applies the forwarding rule to matching ACK packets in the second packet flow; (5) observes the previously determined congestion indicator of the first flow and, upon observing, increasing or reducing a rate of the TCP flow control to the second packet flow, until such congestion on the first packet flow is completely removed; and (6) observes absence of the previously determined congestion indicator of the second flow and, upon observing such absence, removing the forwarding rule from the second switch.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DESCRIPTION OF THE PREFERRED EMBODIMENTS

Figure 1:
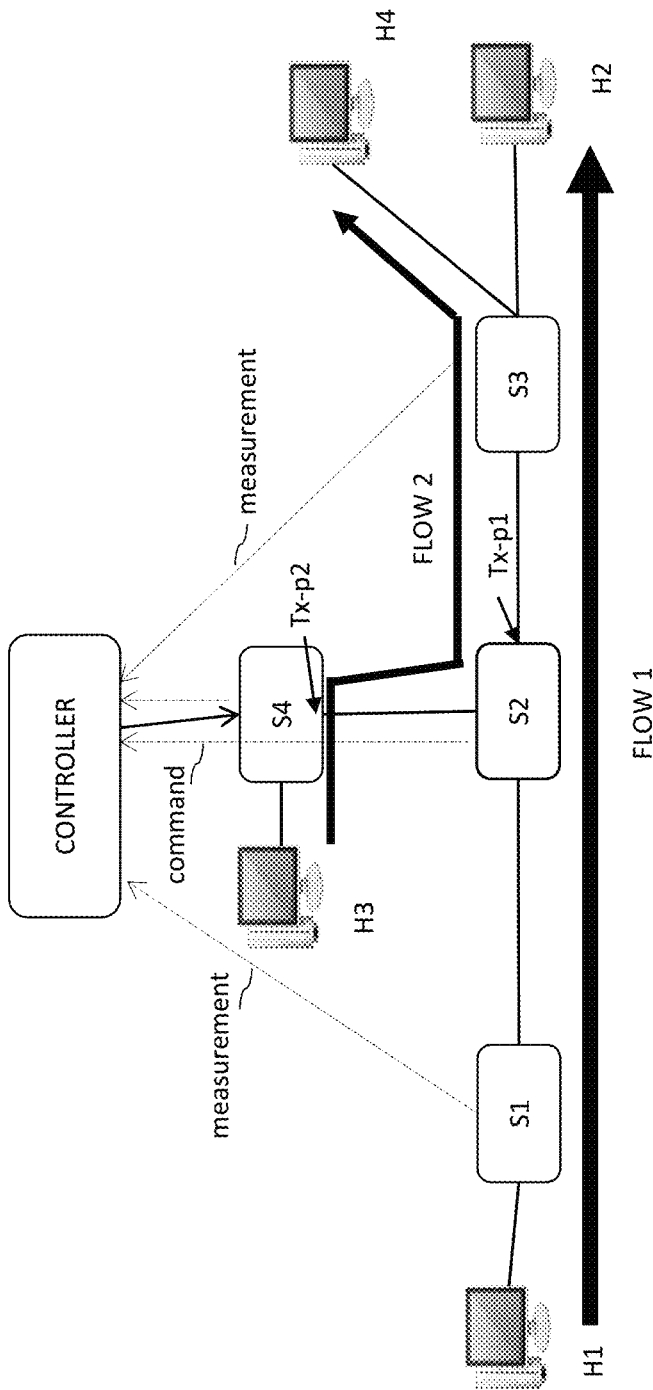
FIG. 1 illustrates and exemplary SDN with the method of this invention.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

An electronic device (e.g., an SDN controller or a switch) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware.

The invention is detailed for an SDN with a controller and many switches. The interface between the SDN controller and a switch is defined by the OpenFlow protocol. However, the invention applies to other programmable networks with other types of controllers, switches and other protocols than OpenFlow.

A system and method is described for adaptive network-based Transmission Control Protocol (TCP) traffic throttling for proactive congestion control in a programmable network such as a Software Defined Network (SDN) by observing the switch queues. The controller, which has the global visibility of the network traffic conditions, prevents anticipated network congestion by requesting the switches to slightly modify the behavior of certain TCP flows unbeknown to end hosts so that other (large, important or delay-sensitive) flows do not get into a congestion mode which causes them to reduce rate, and hence quality.

A key aspect of the invention is to apply network-based flow-control techniques intelligently on certain selected TCP flows and/or at certain switch ports that contribute indirectly to congestion to eliminate a bad queue and prevent congestion on other flows. Network-based congestion control mechanisms such as Weighted Random Early Discard (WRED) and Explicit Congestion Notification (ECN) [see RFC 3168 to Ramakrishnan et al. entitled, "The Addition of Explicit Congestion Notification (ECN) to IP," September 2001] have been available in today's routers in IP networks. WRED makes early detection of congestion possible and handles multiple classes of traffic.' WRED can selectively discard lower priority traffic when the router begins to experience congestion on a queue and provides differentiated performance characteristics for different classes of service. ECN is achieved by explicitly marking certain IP packets when congestion is detected in the network. This feature provides an improved method for congestion avoidance by allowing the ECN-enabled end-points to properly react to congestion instead of dropping their packets from the queue in the congested router. Marking packets accommodates applications that are sensitive to delay or packet loss, and provides improved throughput and application performance. Both WRED and ECN suffer from being simple local remedies applied at a router that directly experiences congestion by a local queue overflow, i.e., without the visibility and knowledge of the entire/global network. The capability to identify the traffic that is the real cause of congestion is grossly lacking. It is known that a queue overflow is usually caused by only a single bursty flow (or just few flows), and randomly or blindly discarding packets may not always solve the root of the congestion.

A broad spectrum of network data can now be made available to a centralized controller leading to a major improvement in network conditions since the global view of the network and traffic are now known. Per this patent application, a 'bad queue eliminator' (BQE)' module of the controller, either residing locally within the controller or as an external system attached to the controller with an interface, collects these additional flow and congestion related statistics in real-time from network switches. These statistics are, for example, packet sojourn times through all network queues and queue occupancies (or percent fullness), optionally other measurements such as, physical link utilizations, forwarding table traversal times, switch processing load, and/or other TCP flow-related indicators gathered from an 'agent' residing on all network switches. The interface between BQE and each agent can be OpenFlow or another known interface such as Simple Network Management Protocol (SNMP), OF-CONFIG, or even proprietary.

Although 'packet sojourn time' is a concept typically defined for a 'queue traversal time', it can be extended to a 'total packet sojourn time' to represent the total 'switch traversal time'. Meaning, it can be defined as the time difference between a packet to get into a switch and get out of that switch. Thus, it can be defined as $$\text{Total packet sojourn time} =$$
$$\text{packet sojourn (within } Rx \text{ queue of incoming port)} +$$
$$\text{packet processing time (traversing the forwarding table)} +$$
$$\text{packet sojourn (within } Tx \text{ queue of outgoing port)}.$$

Note that the packet processing time while traversing a forwarding table may also contribute a significant amount of extra delay. If it has an enormous effect on delay, the table must be re-optimized by cleaning up the table or redistributing flow table entries to switches, etc. by controller. The flow table compression techniques are kept out of the scope for this patent application.

Based on a detected congestion in an SDN, BQE determines (i) to which TCP flows to apply flow-control (such as changing rwnd or delaying ACK), and (ii) at which switch port to apply the changes to control queues, and (iii) how to modify the TCP ACK packets of these flows to properly pace traffic. Such intervention to one or more flows in the network alleviates the congestion occurring on other more valuable flows without them being forced into slow-start or congestion avoidance modes that result in reduced data transfer rates.

When a switch reports a potential congestion, say when the minimum packet sojourn times is greater than a specific threshold, the BQE application analyses the entire network for indicators that may be elsewhere, and potentially detecting that the real culprit is not that switch. Subsequently, the controller sends a command to network switches along the path of selected TCP flows to modify the TCP behavior considering the global network topology. The key BQE actions are simple: (i) anticipating (or observing) a congestion by collecting data directly from the network, (ii) determining the best actions, and (iii) programming the switches via the controller to execute these actions. Modifying certain header fields of an ACK message or slightly delaying an ACK, and reducing forwarding table sizes as possible strategies within the switch would be possible flow-control actions to slow down traffic to smooth potential bursts that cause congestion. If a trigger, such as the minimum packet sojourn times triggering notification returns to normal, TCP will return to normal mode. This new technique is implemented within the network without requiring any modification to the host behavior of TCP.

The control of ACK pace can be performed in a closed-loop feedback, i.e., using a simple adaptive approach since determining an optimal value of rwnd or ack delay in one shot is not feasible given the complexity of the dynamics of the network. The close-loop feedback works as follows: (i) reduce rwnd initially to a very small window (say 20% of the original rwnd), (ii) observe the congestion indicators, (iii) if congestion is completely removed, gradually increasing rwnd until the congestion is about to start. Another technique is (i) reduce rwnd initially to window somewhat smaller than the original rwnd (say to 80% of the original rwnd), (ii) observe the congestion indicators, (iii) if the congestion is not completely removed, gradually decrease rwnd until the congestion is completely removed.

The method of invention works specifically in an SDN environment because the entire network can be monitored and controlled centrally. This unique feature, not previously available, gives us the ability to observe the network and produce network conditions better than the legacy networks. The method of invention, leveraging the SDN architecture, comprises four simple steps:

1) Controller collects traffic data such total packet sojourn times, minimum packet sojourn times, and/or Tx/Rx queue overflows in switch ports from network switches to anticipate potential traffic congestion problems. Optionally, other network measurements such as link utilization (historic), forwarding table traversal times and switch processing load can also be used. Controller even compiles the data into a form of historic data to identify general congestion trends in the network such as hourly or daily congestion on certain link or switches, and/or real time data to pin-point possible problems in real-time.

2) More intelligent switches can report to the controller via a notification message only a specific congestion indicator such as minimum total packet sojourn times being over a threshold on certain port(s) under congestion.

3) Controller determines by correlating data the causes of congestion, which important TCP flows are affected, and the actions required to prevent/eliminate congestion. This determination can be based on step 1) only (i.e., without receiving a notification) purely based on an anticipation of a congestion, or 1) and 2) together based on an observed (ongoing) congestion.

4) Controller sends a message using the southbound interface (such as OpenFlow), to each affected network switch(es), and instructs as to the action to be taken in an OpenFlow forwarding rule. This action can be executed in two different ways:

Controller sending a complete instruction such as a forwarding rule (match-action), for example, (i) as to how to modify an ACK for certain (chosen) TCP flows (or switch ports), or (ii) hold on to an ACK for a short period of time before releasing it.

Controller sends only a trigger to the switch for certain TCP flows (or switch ports), and the switch determines as to how to act on an ACK. This method requires additional intelligence in the switch.

The method of this invention first exploits the fact that the TCP rate is equal to the rate of the "ACK-clock" when the window size is constant. In this case, control of the ACK rate results in a more smooth bursts in TCP transmission thereby yielding significant multiplexing gains in the network. When the window size is not constant, we can use the two fields, receive window (RWND) and ACK number fields within the ACK message to control the size of the window as well as the bytes in flight, respectively.

In summary, upon the forwarding rules received from the controller, the method of this invention causes the network switches to apply flow-control on certain flows by modifying (a) the ACK pace and/or (b) the receiver's advertised window size, rwnd, located within the ACK to control the rate of ACKs the TCP sender receives to regulate the TCP sender's data rate, or to hold-up ACKs for short time interval to govern sender's pace. The trigger is the network congestion observed in 1) and 2) above. One of the key triggers is identified as a bad queue by observing the minimum packet sojourn times.

ACK based pacing is not new. It is known in prior art as it is a key enabler that regulates the TCP traffic by controlling the rate of arrival of acknowledgments to the sender. The sender receiving an ACK sends new packets. Therefore, in the traditional TCP flow control schemes, the sender fills the pipe, waits for an ACK for the data sent, and upon receiving the ACK, it fills up the pipe again, and waits for an ACK again, and so on. There are a few studies in legacy networks that appropriately regulating the inter-ACK timing can optimize the throughput by taking account the network load dynamics. We can take advantage of the information available at the controller to improve ACK-based pacing. More specifically, a rate-prediction is made considering the switch's average queue occupancy (which will affect RTT) on the path. In our proposed scheme, we will adapt the ACK-rate (r) at an edge-node (note: Since we will maintain per TCP flow state and need to require buffering, reading and writing into TCP headers, the solution will be more applicable to network edges rather than cores, assigned by SDN-controller.

FIG. 1 illustrates a simple SDN scenario with a single controller and four switches, S1, S2, S3 and S4. Flow-1 is a TCP flow carrying video traffic between Hosts H1 (source), and H2 (destination), whereas Flow 2 is a TCP flow between Hosts H3 (source) and H4 (destination). Host H1 is attached to S1, H2 and H4 are attached to S3, and H3 is attached to S4. Using the control interface (such as OpenFlow), the controller collects congestion related measurements from switches S1, S2, S3 and S4. It detects that the transmit (Tx) queue of S2 (on the switch port towards S3), Tx-p1, acts as a 'bad queue'. Meaning the minimum packet sojourn time on this queue is above the defined threshold over a specified observation period. There are two flows passing through Tx-p1, Flow 1 and Flow 2. In this scenario, the video traffic of Flow 1 is defined as the 'select flow' that we would like to protect from congestion, and Flow 2 is not. Upon receiving the information on Tx-p1, controller determines that flow-control can be applied to Flow 2. It also observes that in fact Flow 2 creates the problem.

Consider the realistic scenario of an access network between H3 and S4 that is a broadband network (such as Gigabit Ethernet), while the traffic is funneling into a narrow band network between S4 and S2 (such as a 45 Mbps facility). This scenario will cause a bottleneck at S4. Note that the ACK traffic of Flow 2 is in the reverse direction of the traffic, i.e., from H4 towards H3. Thus, according to an aspect of this invention, the controller will send a forwarding rule to S4 to throttle the traffic originating from H3, by simply slowing down the ACK of Flow-2 at switch S4. The new forwarding rule downloaded to S4 is (i) to delay ACK messages by 'd' msecs for packets matching Flow-2 characteristics (e.g., source and destination IP addresses), or (ii) to reduce rwnd. When Flow-2 substantially reduces rate, the bad queue in S2 is eliminated as a result, and without needing to slow down Flow-1.

Figure 2:
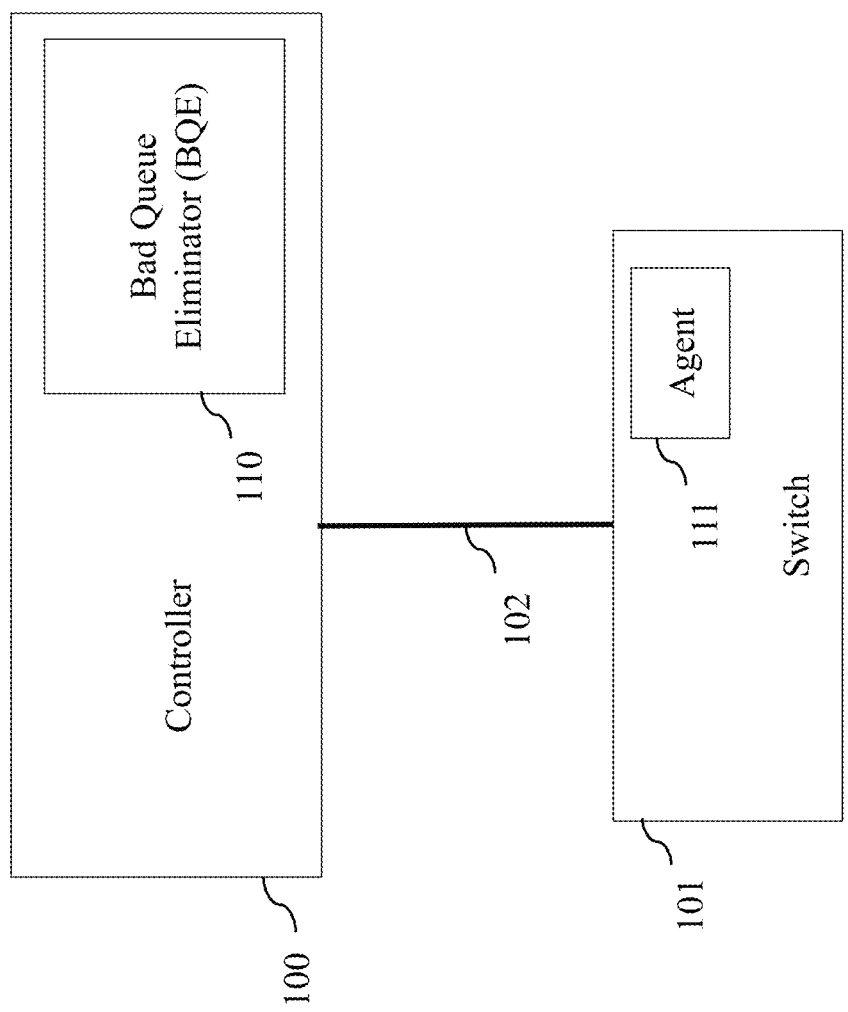
FIG. 2 illustrates an embodiment of system of invention.

An embodiment of the system of invention is illustrated in FIG. 2 wherein BQE 110 is a software application resident with controller 100, and Agent 111 is a resident software application within switch 101. The interface between Agent 111 and BQE 110 is OpenFlow or a similar interface 102. This embodiment embeds the additional capabilities to perform the methods of this invention within the existing controller system and the control-data interface.

Figure 3:
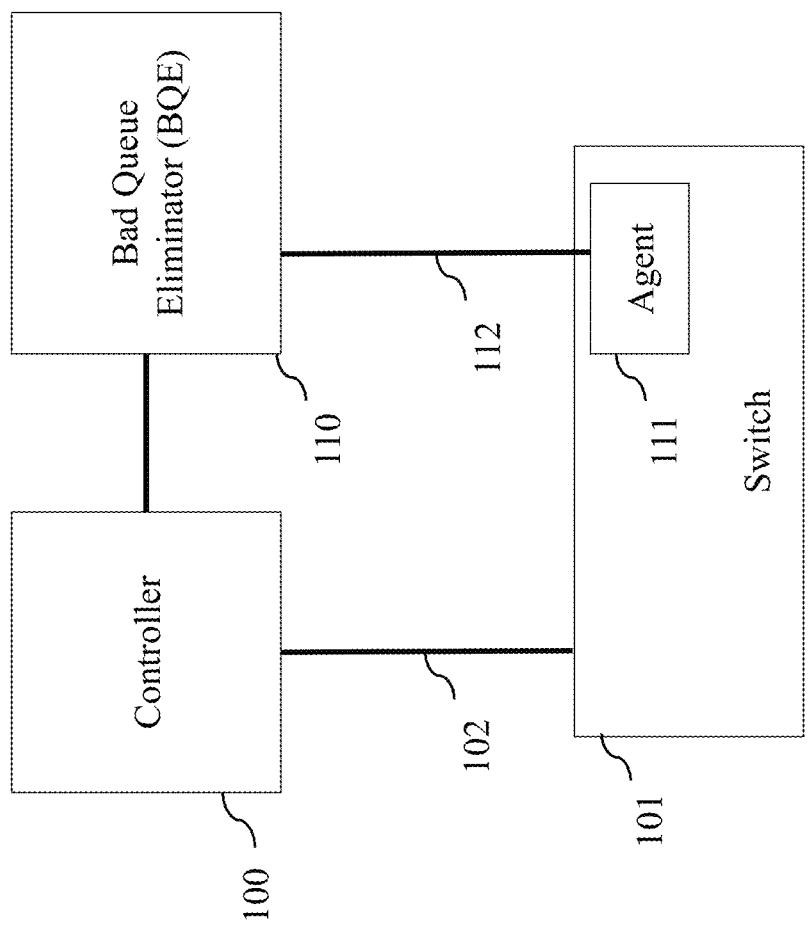
FIG. 3 illustrates another embodiment of BQE.

Another embodiment of the system of invention is illustrated in FIG. 3 wherein BQE 110 is a software application outside controller 100, and Agent 111 is a resident software application within switch 101. The interface between Agent 111 and BQE 110 is OpenFlow or a similar interface 112, which is a different interface than interface 102. This embodiment implements the additional capabilities to perform the methods of this invention outside the existing controller system as an external application of the controller.

In another embodiment, Agent 111 may reside outside switch 101 as an adjunct application that monitors the flows to collect measurements. In this embodiment, Agent 111 may obtain flow related data by switch 101 mirroring (copying) packet data onto an external application such as a 'monitor'. This alternative is not illustrated since it is straightforward.

Figure 4:
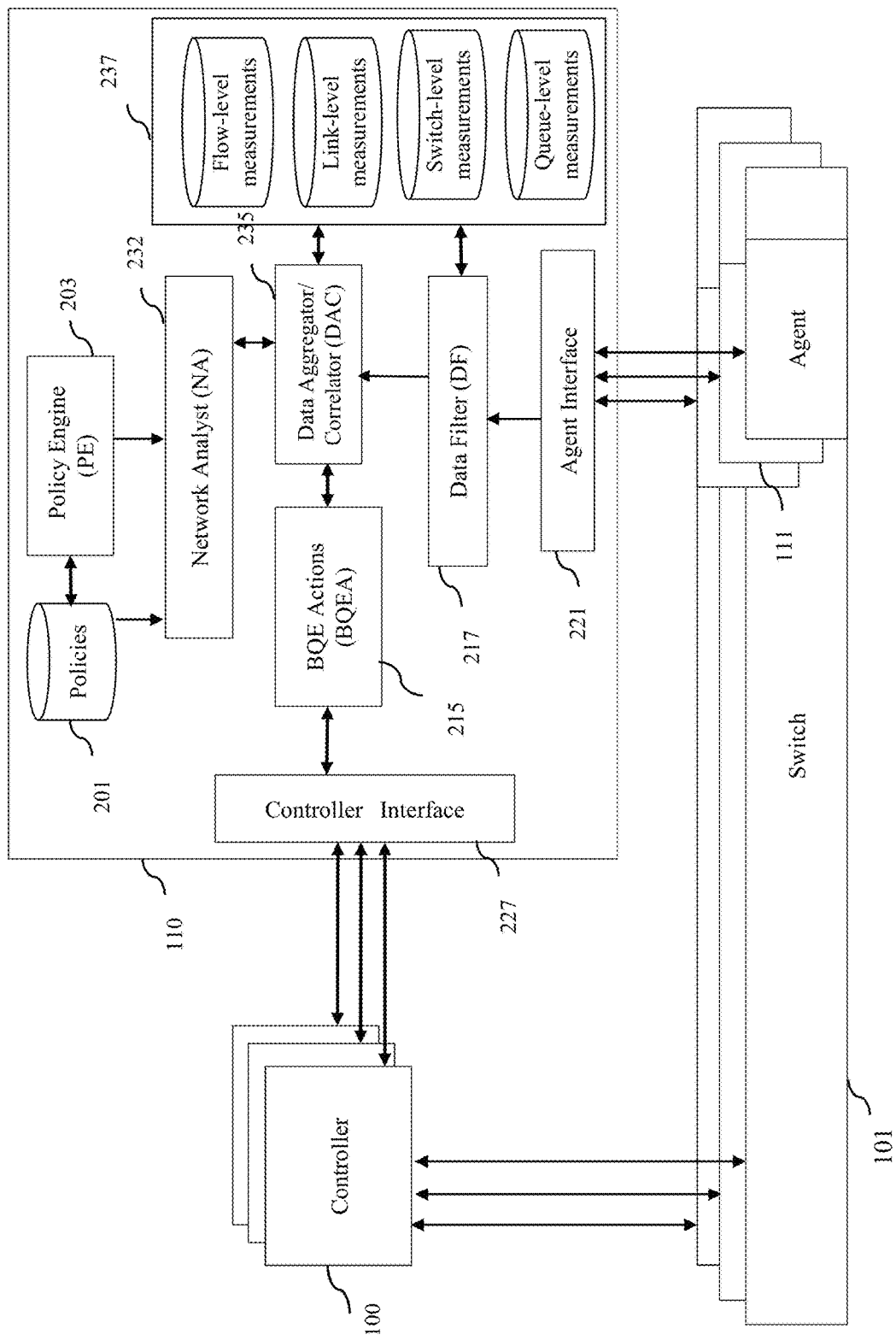
FIG. 4 illustrates the subsystems of BQE.

A system block diagram showing key sub-functions of BQE is illustrated in FIG. 4. Although in this embodiment, the sub-functions are shown as separate functions integrated together wherein the output of a sub-function is an input to another, in another embodiment some or all of these sub-functions can be fully integrated into a single function wherein the monitored data from the network switches is the input and the forwarding rule request to slow down certain TCP flow(s) is the output. It will be obvious to someone skilled in the art to create different embodiments by applying different levels of integration to certain sub-functions. In another embodiment, all these functions can be fully integrated into the controller as illustrated in FIG. 2.

BQE 110 has two interfaces: controller interface 227 and agent interface 221. Through control interface 227, it can attach to a controller using an Application Programming Interface (API) supported by the controller to send and receive messages. Through agent interface 221, BQE collects measurements from agent 111 to monitor the congestion status of the network. Using agent interface 221, BQE may request certain packet related information measured by agent 111. In addition, this interface can be used by the switch to send notifications to BQE 110 if/when the switch observes any anomalies that results in a congestion or bad queue. In one embodiment, BQE 110 is the sole application that can detect a congestion. In another embodiment in which agent 111 has intelligent software such as threshold checks of certain counts to determine, without using BQE 110's logic, that there is congestion on that switch due to a bad queue. Although the flow measurements collected from agent 111 are not detailed, at least information that allows calculation of minimum packet sojourn times (total and per flow) and/or packet delays within queues would be needed.

Data filter 217 receives (potentially massive amount of) raw data from agent interface 221 throughout the network, cleans up the data and stores them in appropriate databases 237. It will be obvious to someone skilled in art that some data may be queue level, other data may be switch, link or packet flow level, which may be stored in different partitions of the database. Data aggregator/correlator 235 performs appropriate levels of data aggregation and correlation, and prepares data in a form that network analyst 232 can easily use. Network analyst 232 is where a bad queue is detected. Once network analyst detects a bad queue by analyzing the minimum packet sojourn times of packets and queue fullness, and pin points the location of a bad queue, it collaborates with policy engine 203 to determine if there are any group of flows that has to be protected from the detected bad queue. Network analyst 232 may also have a visual interface for the system administrator showing locations of congestion points in the network. Policy engine 203 contains policies in policy database 201. If the bad queue causes congestion on a selected group of flows, then it looks up for other TCP flows sharing the same bad queue with the select group of flows that must be protected. This data can be obtained directly form data aggregator/correlator 235. Network analyst determines where to apply (switch and port) and how much of flow control to apply to these other TCP flows to relieve the bad queue. Usually (but not always) the ingress switch of the other TCP flow is the right location for flow control. Once such a determination is made, TCP congestion control actions 215 calculates the ACK pace or the receive window size of said other TCP flow so that the bad queue is relieved. Once this information is generated, BQE 110 makes a request from controller 100 to send a forwarding rule to the proper switch of said other flow to either slow-down the ACK pace or reduce the rwnd of the ACK. Thereafter, controller 100 generates appropriate forwarding rules and sends them to the ingress switch using OpenFlow.

Figure 5:
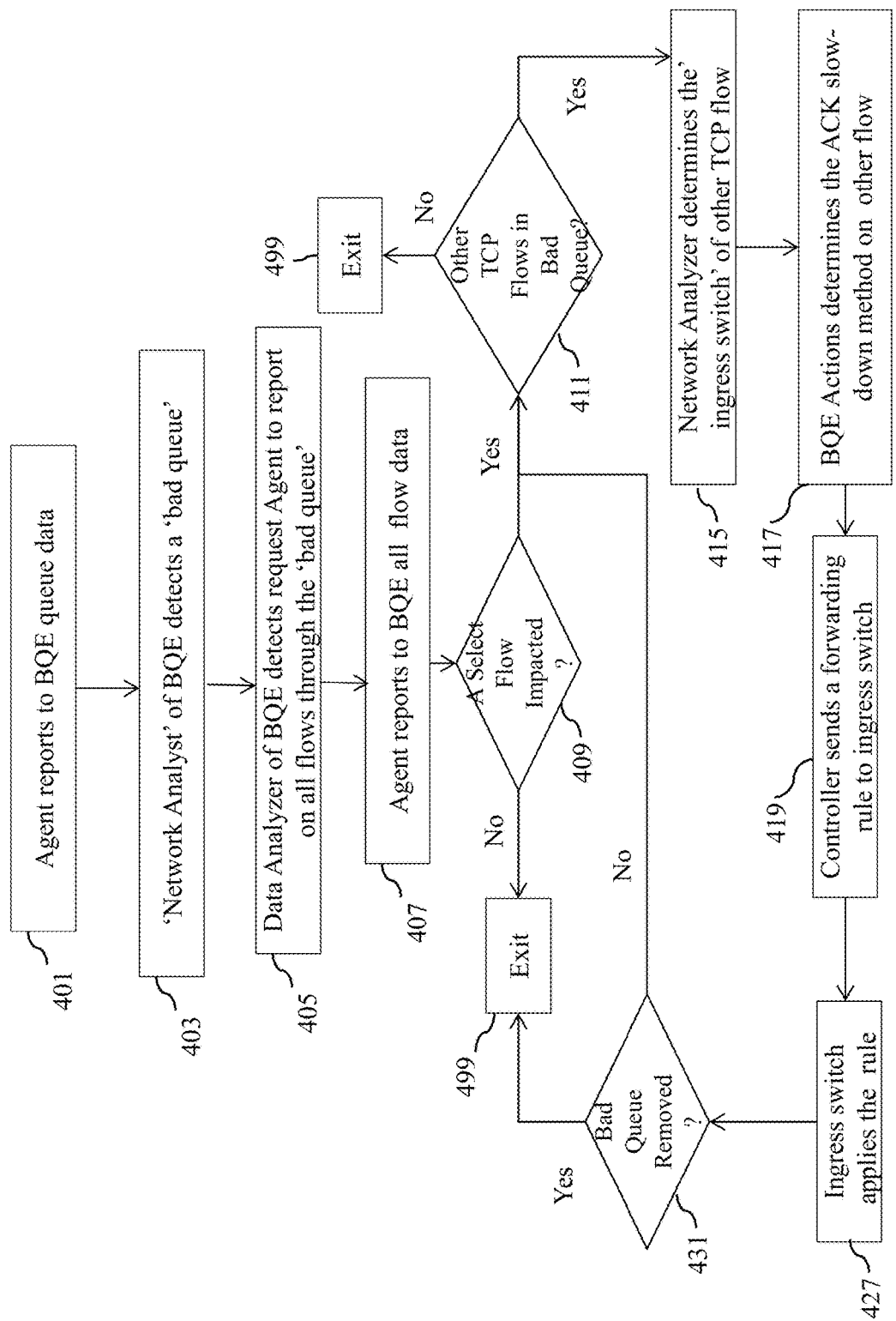
FIG. 5 illustrates a flow chart of the method of invention.

A simple flow chart of the method of invention, using the system of invention illustrated in FIG. 4, is given in FIG. 5. The process starts at step 401 in which agent 111 reports data related to network queues to BQE 110. After the data is placed into appropriate databases, cleaned and correlated, network analyst 232 makes a determination that there is a bad queue in the network. After that determination, data aggregator/correlator 235 requests agent 111 to collect data from other switches in step 405. This step will not be needed if all agents in the network report measurement all the time. It is possible that only the switch monitoring a bad queue may be reporting data in which case BQE must request agents on other switches to report on their queues as well which is performed in step 407. In step 409, network analyst analyzes is the bad queue causes a select flow to become congested. This step is performed in collaboration with policy engine 203 and its policy database 201. The determination of those flow(s) causing the bad queue is performed by using an intelligent correlation algorithm that correlates multiple flows with multiple congested queues. If the impacted flow is a select flow, in checkbox 409, then network analyst determines if there are other TCP flows through the same bad queue in step 411. If so, network analyst further analyses the queue occupancies on the switches along the path of the other CP flows to pinpoint a switch in which the other TCP flow will be paced down in step 415. This will result in a TCP's action on ACK packets of the other flow(s) to cause slow down which is determined by TCP congestion control actions 215 in step 417. Finally this action results in a forwarding rule that controller generates for the ACK packets of the other TCP flow on the selected switch (ingress or egress switch is the most likely selection) in step 419. Once the selected switch applies the rule in step 427, BQE continues to monitor the status of the bad queue to make sure the slow down removes it. If it removes it, then the forwarding rule is deleted, and the network is back to normal operations. Otherwise, in checkbox 431, the flow control continues with other TCP flows or further slows down in an iterative way until the bad queue is cleared.

In one embodiment, the present invention provides a method as implemented in a controller in a software defined network (SDN), where a packet flow traverses at least a first switch and a second switch that are part of the SDN, the first and second switches communicating with the controller via a first and second control connection, respectively, the method comprising the steps of: (a) collecting, via the first control connection, a first data indicative of a congestion at the first switch, and collecting, via the second control connection, a second data indicative of a congestion at the second switch; (b) determining, from collected first and second data, a presence of queue fullness in the second switch; (c) determining when to apply TCP flow control to the packet flow at the first switch based on the determining in (b); (d) sending a forwarding rule to the first switch to intercept ACK packets of the packet flow, wherein the first switch installs the forwarding rule and applies the forwarding rule to matching ACK packets; (e) observing the previously determined queue fullness in the second switch and, upon observing, increasing or reducing the rate of said TCP flow control, until the congestion is completely removed; and (f) observing absence of the previously determined queue fullness in the second switch and, upon observing such absence, removing the forwarding rule from the first switch.

In another embodiment, the present invention provides a method as implemented in a controller in a software defined network (SDN), where a first packet flow and a second packet flow traverses at least a first switch that is part of the SDN and the second packet flow comprising a TCP flow originating at a second switch, the first and second switches communicating with the controller via a first and second control connection, respectively, the method comprising the steps of: (a) collecting, via the first control connection, congestion indicators associated with the first and second packet flows; (b) determining, from collected data in (a), a presence of queue fullness in the first switch; (c) determining when to apply TCP flow control only to the second packet flow at the second switch based on the determining in (b); (d) sending a forwarding rule to the second switch to intercept ACK packets of the second packet flow, wherein the second switch installs the forwarding rule and applies the forwarding rule to matching ACK packets in the second packet flow; (e) observing the previously determined congestion indicator of the first flow and, upon observing, increasing or reducing a rate of said TCP flow control to the second packet flow, until such congestion on the first packet flow is completely removed; and (f) observing absence of the previously determined congestion indicator of the first flow and, upon observing such absence, removing the forwarding rule from the second switch.

In yet another embodiment, the present invention provides a controller in a software defined network (SDN) comprising: (a) a first logic to receive measurements of congestion indicators from each network switch; (b) a database storing received measurements; (c) a network analyzer logic determining congestion location within the SDN; (d) an intelligent correlation algorithm to determine which TCP flows to apply network-based flow control to eliminate queue fullness, and at which switch within the SDN to apply such network-based flow control; (e) a second logic to translate the network-based flow control determined in (d) to forwarding rules, where a packet flow traverses at least a first switch and a second switch that are part of the SDN, the first and second switches communicating with the controller via a first and second control connection, respectively, wherein the controller: (1) collects, via the first control connection, a first congestion indicator at the first switch, and collecting, via the second control connection, a second congestion indicator at the second switch; (2) determines, from collected first and second congestion indicators, a presence of queue fullness in the second switch; (3) determines when to apply TCP flow control to the packet flow at the first switch based on the determining in (2); (4) sends a forwarding rule to the first switch to intercept ACK packets of the packet flow, wherein the first switch installs the forwarding rule and applies the forwarding rule to matching ACK packets; (5) observes the previously determined congestion indicator, upon observing, increasing or reducing a rate of the TCP flow control, until such congestion is completely removed; and (6) observes absence of the previously determined queue fullness in the second switch and, upon observing such absence, removing the forwarding rule from the first switch.

In yet another embodiment, the present invention provides a controller in a software defined network (SDN) comprising: (a) a first logic to receive measurements of congestion indicators from each network switch; (b) a database storing received measurements; (c) a network analyzer logic determining congestion location within the SDN; (d) an intelligent correlation algorithm to determine which TCP flows to apply network-based flow control to eliminate queue fullness, and at which switch within the SDN to apply such network-based flow control; (e) a second logic to translate the network-based flow control determined in (d) to forwarding rules, where a first packet flow and a second packet flow traverses at least a first switch that is part of the SDN and the second packet flow comprising a TCP flow originating at a second switch, the first and second switches communicating with the controller via a first and second control connection, respectively, wherein the controller: (1) collects, via the first control connection, data indicative of a congestion associated with the first and second packet flows; (2) determines, from collected data in (1), a presence of queue fullness in the first switch; (3) determines when to apply TCP flow control only to the second packet flow at the second switch based on the determining in (2); (4) sends a forwarding rule to the second switch to intercept ACK packets of the second packet flow, wherein the second switch installs the forwarding rule and applies the forwarding rule to matching ACK packets in the second packet flow; (5) observes the previously determined congestion indicator of the first flow and, upon observing, increasing or reducing a rate of the TCP flow control to the second packet flow, until such congestion on the first packet flow is completely removed; and (6) observes absence of the previously determined congestion indicator of the second flow and, upon observing such absence, removing the forwarding rule from the second switch.

Many of the above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer readable medium" and "computer readable media" are entirely restricted to to tangible, physical objects that store information in a form that is readable by a computer.

These terms exclude any wireless signals, wired download signals, and any other ephemeral signals.

CONCLUSION

A system and method has been shown in the above embodiments for the effective implementation of a system and method to prevent persistent full switch queues in software defined networks. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by particular communication hardware, software/program, communication environment, or specific computing hardware.

The invention claimed is:

1. A method as implemented in a software defined network (SDN) controller in a SDN, where a packet flow traverses at least a first switch and a second switch that are part of the SDN, the first and second switches communicating with the controller via a first and second control connection, respectively, the method comprising the steps of:
   a) collecting, via the first control connection, a first data indicative of a congestion at the first switch, and collecting, via the second control connection, a second data indicative of a congestion at the second switch;
   b) determining, from collected first and second data, a presence of queue fullness in the second switch;
   c) determining when and how much TCP flow control to apply to the packet flow at the first switch based on the determining in (b), the SDN controller, not a receiver host, determining when to apply TCP flow control, the TCP flow control achieved by any of, or a combination of the following: delaying ACK packets of the packet flow or decreasing a receiver window size, rwnd, within a header of ACK packets of the packet flow;
   d) sending a forwarding rule to the first switch to intercept ACK packets of the packet flow, wherein the first switch installs the forwarding rule and applies the forwarding rule to matching ACK packets;
   e) observing the previously determined queue fullness in the second switch and, upon observing, increasing or reducing the rate of said TCP flow control, until the congestion is completely removed; and
   f) observing absence of the previously determined queue fullness in the second switch and, upon observing such absence, removing the forwarding rule from the first switch.

2. The method of claim 1, wherein the first and second data indicative of congestion are any of the following: total packet sojourn times, minimum packet sojourn times, and queue fullness on transmit and receive buffers associated with the first or second switch.

3. The method of claim 1, wherein the first and second control connections are based the OpenFlow protocol.

4. The method of claim 1, wherein the method further comprises using a correlation algorithm and data collected in (a) to precisely locate packet flow(s) causing congestion and to determine a best switch to apply flow control.

5. A method as implemented in a software defined network (SDN) controller in a SDN, where a first packet flow and a second packet flow traverses at least a first switch that is part of the SDN and the second packet flow comprising a TCP flow originating at a second switch, the first and second switches communicating with the controller via a first and second control connection, respectively, the method comprising the steps of:
   a) collecting, via the first control connection, congestion indicators associated with the first and second packet flows;
   b) determining, from collected data in (a), a presence of queue fullness in the first switch;
   c) determining when and how much TCP flow control to apply only to the second packet flow at the second switch based on the determining in (b), the SDN controller, not a receiver host, determining when to apply TCP flow control, the TCP flow control achieved by any of, or a combination of the following: delaying ACK packets of the packet flow or decreasing a receiver window size, rwnd, within a header of ACK packets of the packet flow;
   d) sending a forwarding rule to the second switch to intercept ACK packets of the second packet flow, wherein the second switch installs the forwarding rule and applies the forwarding rule to matching ACK packets in the second packet flow;
   e) observing the previously determined congestion indicator of the first flow and, upon observing, increasing or reducing a rate of said TCP flow control to the second packet flow, until such congestion on the first packet flow is completely removed; and
   f) observing absence of the previously determined congestion indicator of the first flow and, upon observing such absence, removing the forwarding rule from the second switch.

6. The method of claim 5, wherein a congestion indicator is any of the following: total packet sojourn times, minimum packet sojourn times, and queue fullness on transmit and receive buffers associated with the first or second switch.

7. The method of claim 5, wherein TCP flow control is achieved by delaying ACK packets of the second packet flow.

8. The method of claim 5, wherein TCP flow control is achieved by decreasing a receiver window size, rwnd, within a header of ACK packets of the second packet flow.

9. The method of claim 5, wherein the first and second control connections are based the OpenFlow protocol.

10. A software defined network (SDN) comprising a plurality of switching devices and a software defined network controller in the SDN, the SDN controller comprising:
   a) a first logic to receive measurements of congestion indicators from each network switch;
   b) a database storing received measurements;
   c) a network analyzer logic determining congestion location within the SDN;
   d) an intelligent correlation algorithm to determine which TCP flows to apply network-based flow control to eliminate queue fullness, and at which switch within the SDN to apply such network-based flow control;
   e) a second logic to translate the network-based flow control determined in (d) to forwarding rules,
   where a packet flow traverses at least a first switch and a second switch that are part of the SDN, the first and second switches communicating with the controller via a first and second control connection, respectively, wherein the controller:
      (1) collects, via the first control connection, a first congestion indicator at the first switch, and collecting, via the second control connection, a second congestion indicator at the second switch;
      (2) determines, from collected first and second congestion indicators, a presence of queue fullness in the second switch;
      (3) determines when and how much TCP flow control to apply to the packet flow at the first switch based on the determining in (2), the SDN controller, not a receiver host, determining when to apply TCP flow control, the TCP flow control achieved by any of, or a combination of the following: delaying ACK packets of the packet flow or decreasing a receiver window size, rwnd, within a header of ACK packets of the packet flow;
      (4) sends a forwarding rule to the first switch to intercept ACK packets of the packet flow, wherein the first switch installs the forwarding rule and applies the forwarding rule to matching ACK packets;
      (5) observes the previously determined congestion indicator, upon observing, increasing or reducing a rate of the TCP flow control, until such congestion is completely removed; and
      (6) observes absence of the previously determined queue fullness in the second switch and, upon observing such absence, removing the forwarding rule from the first switch.

11. The SDN controller of claim 10, wherein measurements received by the first logic is either periodic or upon congestion detection that exceeds a threshold.

12. The SDN controller of claim 10, wherein the congestion indicator is any of the following: total packet sojourn times, minimum packet sojourn times, and queue fullness on transmit and receive buffers associated with the first or second switch.

13. The SDN controller of claim 10, wherein the first and second control connections are based the OpenFlow protocol.

14. A software defined network (SDN) comprising a plurality of switching devices and a software defined network controller in the SDN, the SDN controller comprising:
   a) a first logic to receive measurements of congestion indicators from each network switch;
   b) a database storing received measurements;
   c) a network analyzer logic determining congestion location within the SDN;
   d) an intelligent correlation algorithm to determine which TCP flows to apply network-based flow control to eliminate queue fullness, and at which switch within the SDN to apply such network-based flow control;
   e) a second logic to translate the network-based flow control determined in (d) to forwarding rules,
   where a first packet flow and a second packet flow traverses at least a first switch that is part of the SDN and the second packet flow comprising a TCP flow originating at a second switch, the first and second switches communicating with the controller via a first and second control connection, respectively, wherein the controller:
      (1) collects, via the first control connection, data indicative of a congestion associated with the first and second packet flows;
      (2) determines, from collected data in (1), a presence of queue fullness in the first switch;
      (3) determines when and how much TCP flow control to apply only to the second packet flow at the second switch based on the determining in (2), the SDN controller, not a receiver host, determining when to apply TCP flow control, the TCP flow control achieved by any of, or a combination of the following: delaying ACK packets of the packet flow or decreasing a receiver window size, rwnd, within a header of ACK packets of the packet flow;
      (4) sends a forwarding rule to the second switch to intercept ACK packets of the second packet flow, wherein the second switch installs the forwarding rule and applies the forwarding rule to matching ACK packets in the second packet flow;
      (5) observes the previously determined congestion indicator of the first flow and, upon observing, increasing or reducing a rate of the TCP flow control to the second packet flow, until such congestion on the first packet flow is completely removed; and
      (6) observes absence of the previously determined congestion indicator of the second flow and, upon observing such absence, removing the forwarding rule from the second switch.

15. The controller of claim 14, wherein measurements received by the first logic is either periodic or upon congestion detection that exceeds a threshold.

16. The controller of claim 14, wherein the congestion indicator is any of the following: total packet sojourn times, minimum packet sojourn times, and queue fullness on transmit and receive buffers associated with the first or second switch.

17. The method of claim 14, wherein the first and second control connections are based the OpenFlow protocol.

* * * * *